United States Patent
Garceau et al.

[19]

[11] Patent Number: 5,975,072
[45] Date of Patent: *Nov. 2, 1999

[54] FLUID FLOW VALVES AND COOKING MACHINE CONTROL SYSTEM UTILIZING SUCH VALVES

[76] Inventors: William J. Garceau, 170 W. 37th St.; Thomas S. Speakman, 100 Adams Dr., both of Reading, Pa. 19606

[*] Notice: This patent is subject to a terminal disclaimer.

[21] Appl. No.: 09/163,334

[22] Filed: Sep. 30, 1998

Related U.S. Application Data

[63] Continuation-in-part of application No. 08/710,010, Sep. 11, 1996, Pat. No. 5,865,164
[60] Provisional application No. 60/003,586, Sep. 12, 1995, and provisional application No. 60/009,996, Jan. 11, 1996.

[51] Int. Cl.[6] ....................................................... F24C 3/00
[52] U.S. Cl. ...................... 126/39 G; 126/39 R; 99/331; 99/339
[58] Field of Search ................................. 126/39 R, 396; 99/331, 333

[56] References Cited

U.S. PATENT DOCUMENTS

| | | |
|---|---|---|
| 409,577 | 8/1889 | Gregory . |
| 848,811 | 4/1907 | Cook ........................................ 251/117 |
| 1,242,245 | 10/1917 | Rutz . |
| 1,414,323 | 4/1922 | Barton . |
| 1,506,434 | 8/1924 | Leins ........................................ 251/117 |

(List continued on next page.)

FOREIGN PATENT DOCUMENTS 105221  8/1942  Sweden ................................. 251/117

*Primary Examiner*—Carroll Dority
*Attorney, Agent, or Firm*—Antonelli, Terry, Stout & Kraus, LLP

[57] ABSTRACT

A cooking machine control system for controlling the consumption of fuel by gas cooking machines, and gas flow valves usable in such cooking machine control systems. The cooking machine control system maintains the cooking surface of the cooking machine at an appropriate standby temperature when no food is being cooked, brings the cooking surface to an appropriate temperature to cook the food, and then returns the cooking surface to the standby gas flow rate. The system can be returned to the standby gas flow rate either after the cooking gas flow rate has been provided for sufficient time for the food to have cooked or after the temperature of the food has reached the desired level. With the cooking machine control system in the standby mode, when food is to be cooked a switch is actuated, applying a start signal to cause a valve to open the cooking flow rate path to cook the food, following which the valve returns the system to the standby mode. In another embodiment, the cooking machine control system includes a first gas pipe which provides gas to each burner of the cooking machine at the standby gas flow rate and a second gas pipe which in the standby mode is closed by a valve. When food is to be cooked, the start signal opens the valve to provide gas to each burner at a rate sufficient to bring the cooking surface to the appropriate cooking temperature.

31 Claims, 6 Drawing Sheets

U.S. PATENT DOCUMENTS

| | | |
|---|---|---|
| 1,631,109 | 5/1927 | Hitzemann . |
| 2,043,991 | 6/1936 | Dalen et al. . |
| 2,371,351 | 3/1945 | Paille . |
| 2,436,575 | 2/1948 | Johnson . |
| 2,498,376 | 2/1950 | Mueller . |
| 2,507,410 | 5/1950 | Kemp .................................. 137/599.1 |
| 2,524,730 | 10/1950 | Lawhon . |
| 2,527,733 | 10/1950 | Imhoff et al. . |
| 2,590,535 | 3/1952 | Harper . |
| 2,632,467 | 3/1953 | Lamar . |
| 2,635,683 | 4/1953 | Klein . |
| 2,965,015 | 12/1960 | Huchok . |
| 3,262,486 | 7/1966 | Rose . |
| 3,488,133 | 1/1970 | Perl . |
| 3,570,391 | 3/1971 | Rejler . |
| 3,635,018 | 1/1972 | De Corso et al. . |
| 3,765,820 | 10/1973 | Ito et al. . |
| 3,827,345 | 8/1974 | Willson . |
| 3,870,859 | 3/1975 | Price . |
| 3,965,322 | 6/1976 | Mori . |
| 3,972,275 | 8/1976 | Schweig et al. . |
| 4,044,660 | 8/1977 | Montague et al. . |
| 4,054,151 | 10/1977 | Parker et al. ........................... 137/599 |
| 4,195,558 | 4/1980 | Speakman . |
| 4,556,032 | 12/1985 | Miller ..................... 123/438 |
| 5,096,116 | 3/1992 | Akamatu et al. ..................... 126/39 G |
| 5,149,262 | 9/1992 | Riehl ..................... 126/39 R |
| 5,865,164 | 2/1999 | Garceau et al. ..................... 126/39 G |

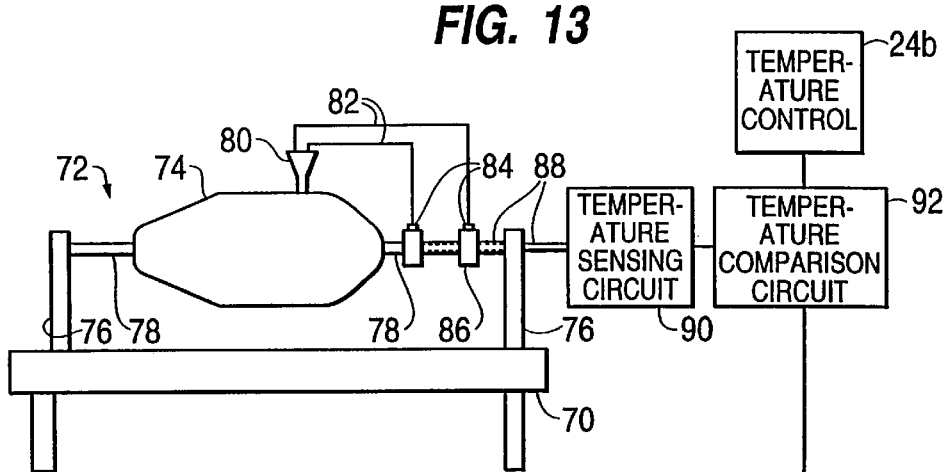
FIG. 13
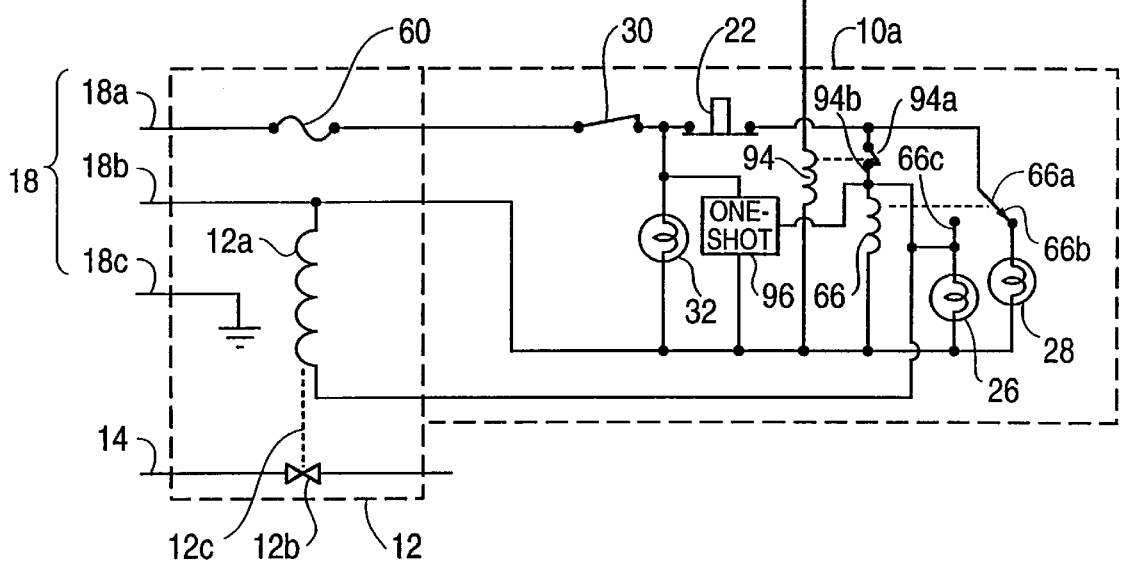
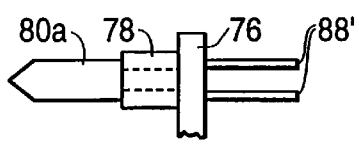
FIG. 14
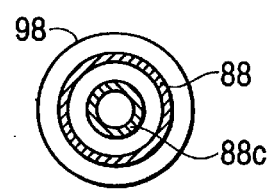
FIG. 15

FLUID FLOW VALVES AND COOKING MACHINE CONTROL SYSTEM UTILIZING SUCH VALVES

CROSS-REFERENCE TO RELATED APPLICATIONS

This application is a continuation-in-part of U.S. patent application Ser. No. 08/710,010 filed Sep. 11, 1996 and now U.S. Pat. No. 5,865,164, which is a continuation-in-part of U.S. Provisional Patent Applications Ser. No. 60/003,586 filed Sep. 12, 1995 and Ser. No. 60/009,996 filed Jan. 11, 1996.

FIELD OF THE INVENTION

The present invention pertains to a cooking machine control system for controlling the consumption of fuel by commercial cooking machines of the type that are used in restaurant kitchens, such as gas fired broilers, and by cooking machines for home use, such as gas/barbecue grills. The cooking machine control system of the present invention is capable of providing gas to burners of a cooking machine at a rate sufficient to maintain a cooking surface of the cooking machine at an appropriate standby temperature when no food is being cooked, while assuring sufficient gas flow to maintain a pilot light for each burner, and capable of rapidly returning the cooking surface to an appropriate cooking temperature when food is being cooked, while avoiding over-cooking, following which the gas flow is automatically reduced to a rate sufficient to maintain the cooked food at an appropriate temperature. Additionally, the present invention pertains to gas flow valves and to gas shut-off valves for use in such cooking machine control systems.

DESCRIPTION OF THE PRIOR ART

Commercial gas cooking machines, such as used in restaurants, typically have a manifold in the form of a large diameter pipe through which gas is provided to orifices of multiple burners of the cooking machine through individual shut-off valves. The orifice of each burner restricts the flow of gas to the desired flow rate for the burner. Additionally, in a typical such gas broiler or other cooking machine, the manifold supplies gas to a pilot light for each burner. Each pilot light provides a small continuous flame adjacent its burner to ignite the main gas flow at the burner when the shut-off valve is opened.

Prior art commercial gas cooking machines typically have no temperature control, and the gas flow and resulting temperature of the cooking area are controlled only by manual shut-off valves for the various burners and the flow characteristics of the individual burners and the orifices supplying gas to them. Consequently, in most restaurant operations, the burners of a broiler or other cooking machine are generally either fully on or fully off. Thus, in a typical restaurant operation, the broiler is turned on and the burner is ignited well before the need to cook food on the broiler, so as to preheat the broiler to be certain that it is ready to cook food on demand. The broiler will typically remain fully on until after the last meal has been served and the restaurant is ready to close. Such commercial broilers typically consume gas continuously at a full rated capacity in the order of 15,000 BTU per hour for each burner during the entire time the restaurant is open. Clearly such operation does not efficiently utilize the gas being provided to the broiler, since there will be significant periods of time during which no cooking takes place yet the broiler burners remain fully on, consuming the full flow of gas. Further, when the broiler is empty, this full on condition results in rapidly increasing the temperature of the cooking surface to a level that is higher than desirable for cooking, with the result that the first few food items placed on the broiler after such an idle period are likely to be scorched or burned. This results in either wasting of food product or serving of poorly prepared food product.

Home cooking machines such as gas/barbecue grills typically have a control permitting adjustment of the gas flow to a rate providing a desired flame level for cooking. However, once set to a particular gas flow rate, the grill permits gas to continue flowing at such rate until the gas flow rate is again manually adjusted by adjusting the control. Such gas/barbecue grills are frequently used during home entertaining, and the host or other cook often has numerous other items to attend to. Consequently, the cook frequently does not give sufficient attention to the grill to assure that the food being cooked on it is not over-cooked.

U.S. Pat. No. 4,195,558 shows a fuel consumption control system for cooking machines in which main gas flow passes through a main gas pipe under control of a solenoid operated valve to the burners, while a bypass gas flow goes through a bypass gas pipe at a flow rate controlled by a manually operated regulating valve to the burners and their pilot lights. During idle times, the solenoid controlled valve is closed so that only the bypass gas pipe provides gas fuel to the burners. This maintains the burners in a stand-by condition from which they can be rapidly heated to the desired cooking temperature. When food is to be cooked, the solenoid controlled valve is opened to permit gas flow through both the main gas pipe and the bypass pipe. This increases the gas flow rate to the burners, and so increases the temperature of the cooking surface. After sufficient time for the food to cook, the solenoid controlled valve is automatically closed to return the cooking machine to the standby condition. However, frequently in order to reduce the standby temperature, the regulating valve held the bypass gas flow rate to a level so low that the pilot lights would be extinguished. Consequently, when the system was turned on at the beginning of the day, the absence of the pilot lights presented a significant safety hazard.

In addition, with the system of U.S. Pat. No. 4,195,558, if only a portion of the broiler is to be utilized, so that gas flow to a portion of the burners is stopped by the cut-off valves of those burners, then the system does not reduce the gas flow during standby, since the bypass gas pipe may provide sufficient gas to maintain the operating burners burning at their cooking level.

SUMMARY OF THE INVENTION

The present invention is an improved cooking machine control system overcoming shortcomings of the prior art. The cooking machine control system of the present invention permits gas to be provided to the cooking machine burners and pilot lights safely and assuredly during stand-by modes when no food is being cooked, with the gas provided at a rate sufficient to maintain the cooking surface at an appropriate stand-by temperature while assuring adequate gas flow to the pilot lights. Further, when food is to be cooked, the present invention assures that gas is provided at a higher rate sufficient to bring the cooking surface to an appropriate cooking temperature, following which the gas flow is returned to the stand-by rate. The present invention reduces the gas flow even when only a portion of the burners of the cooking machine are being utilized. The present invention also is a cooking machine control system which provides gas to a home cooking machine, such as a gas/ barbecue grill, at a rate sufficient to maintain the grill cooking surface at an appropriate cooking temperature, and after the food is cooked reduces the gas flow to a rate sufficient to maintain the cooking surface at a temperature keeping the food warm, without over-cooking the food.

In one aspect, the present invention is a valve apparatus including a valve body having an inlet, an outlet, a valve member movable within the valve body to define alternatively a first gas flow path through the valve body and a second gas flow path through the valve body, and an actuator for moving the valve member between a first valve position in which gas flow is prevented along the first gas flow path but permitted along the second gas flow path, and a second valve position in which gas flow is permitted along the first gas flow path.

In one preferred embodiment, the valve apparatus includes a valve body having an inlet, an outlet, means within the valve body defining a first internal chamber communicating with the inlet and a second internal chamber communicating with the outlet, means within the valve body defining a communication opening between the first and second internal chambers to provide the first gas flow path from the inlet, through the first internal chamber, the communication opening, and the second internal chamber to the outlet to permit gas flow from the inlet, along the first gas flow path, to the outlet, and means within the valve body member defining a bypass opening between the first internal chamber and the second internal chamber to provide the second gas flow path from the inlet, through the first internal chamber, the bypass opening, and the second internal chamber to the outlet to permit gas flow from the inlet, along the second gas flow path, to the outlet. This embodiment of the valve apparatus further includes a valve member within the valve body, and an actuator for moving the valve member between a first valve position in which the valve member blocks the communication opening to prevent gas flow along the first gas flow path while allowing gas flow along the second gas flow path, and a second valve position in which the communication opening is open to permit gas flow along the first gas flow path. In another preferred embodiment, the valve apparatus includes a valve body having an inlet and an outlet, and a ball rotatably positioned within the valve body with a first bore passing through the ball and having a first diameter, and a second bore passing through the ball transverse to the first bore and having a smaller diameter. This embodiment of the valve apparatus further includes means for rotating the ball within the valve body between a first position in which the first bore provides a first gas flow path and a second position in which the second bore provides a second gas flow path at a lower gas flow rate than that of the first gas flow path.

Further, the present invention is a cooking machine control system comprising an inlet gas pipe for receiving gas from a gas source, an outlet gas pipe for providing gas to the burners of a cooking machine, and a controller for controlling the actuator of a valve apparatus, such as one of those described above, which then provides gas to the burners of the cooking machine at a gas flow rate sufficient to maintain the cooking surface of the cooking machine at an appropriate stand-by temperature. In response to a start signal indicating that food is to be cooked, the controller unit causes the valve member to provide gas to the burners at a gas flow rate sufficient to bring the cooking surface to the appropriate cooking temperature. After the food has been cooked, the controller causes the valve member to return the gas flow rate to the rate sufficient to maintain the cooking surface at the appropriate standby temperature.

In another aspect, the present invention is a cooking machine control system which includes an inlet gas pipe for receiving gas from a gas source, a plurality gas pipes for providing gas to each of the plurality of burners of a cooking machine, and a bypass gas pipe connecting the inlet gas pipe to each of the plurality of burner gas pipes for supplying gas to the burner gas pipes at a gas flow rate sufficient to maintain the cooking surface of the cooking machine at the appropriate stand-by temperature. The bypass gas pipe also connects to a pilot light for each of the burners. A controller controls a control valve which couples the inlet gas pipe to each of the burner gas pipes. The controller causes the control valve to normally assume a first condition in which gas is prevented from flowing through the control valve. The controller is responsive to a start signal to cause the control valve to assume a second condition in which gas is permitted to flow through the control valve to the burner gas pipes at a second gas flow rate. A switch is provided for applying the start signal to the controller. This control system permits gas to flow to the plurality of burner gas pipes at the first gas flow rate to maintain the cooking surface at an appropriate stand-by temperature and to flow to the pilot lights at a rate sufficient to keep them burning, and in response to the control signal permits gas to flow to the plurality of burner gas pipes at a greater flow rate to bring the cooking surface to the appropriate cooking temperature, and after the food has been cooked permits gas to flow to the plurality of burner gas pipes at the first gas flow rate.

In each of these two control systems, the controller in one embodiment of the present invention includes a timer which is activated when the controller receives the start signal to provide gas at the cooking temperature gas flow rate and which causes the valve member to return to its standby condition after a predetermined period of time, sufficient to cook the food. Rather than the timer, the controller in a second embodiment includes a temperature sensor which senses the temperature of the food as the food is cooking and which causes the valve member to return to its standby condition when the food has reached a preselected temperature, indicative of the food being cooked to the desired extent.

Further, the present invention is a gas shut-off valve having a first inlet adapted for connection to a first gas pipe for receipt of gas therefrom, a second inlet adapted for connection to a second gas pipe for receipt of gas therefrom, an outlet adapted for connection to a gas-utilizing device, and a valve member movable between a first valve position, in which gas from both the first inlet and the second inlet is permitted to flow to the outlet, and a second valve position in which gas from the first and second inlets is blocked from the outlet.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

Figure 1:
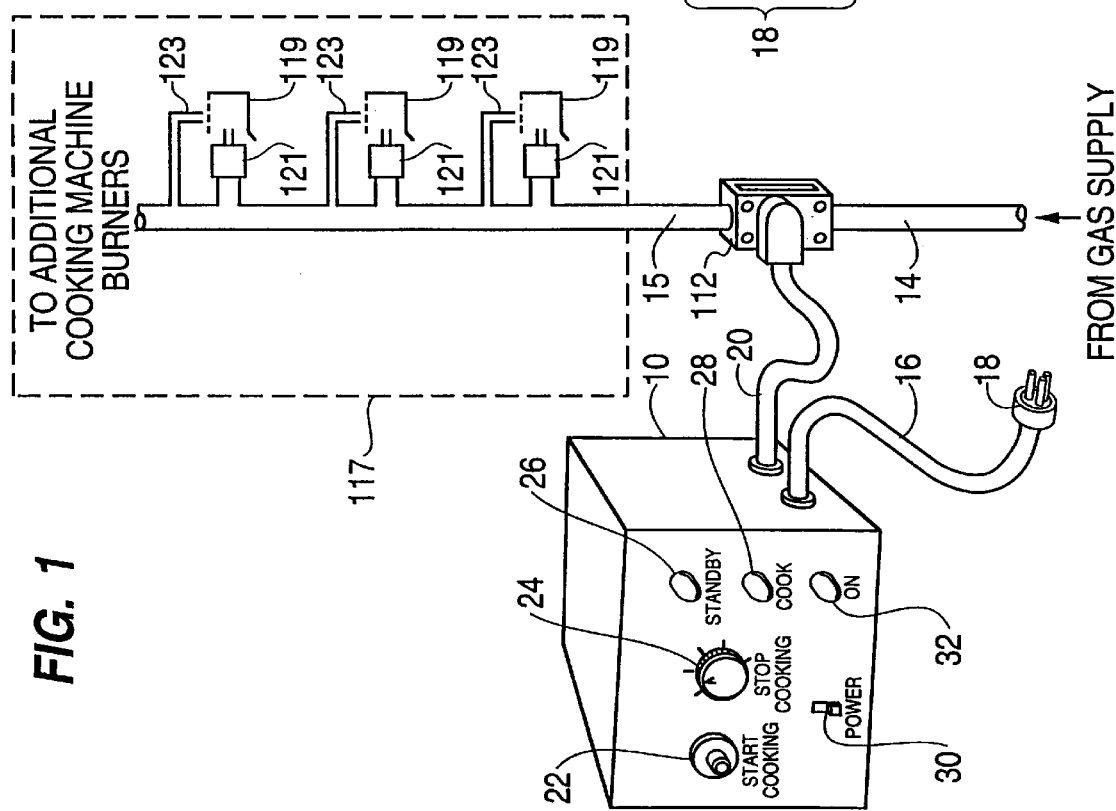
FIG. 1 is a partially perspective, partially schematic view of a first embodiment of a cooking machine control system and cooking machine burners in accordance with the present invention.
Figure 3:
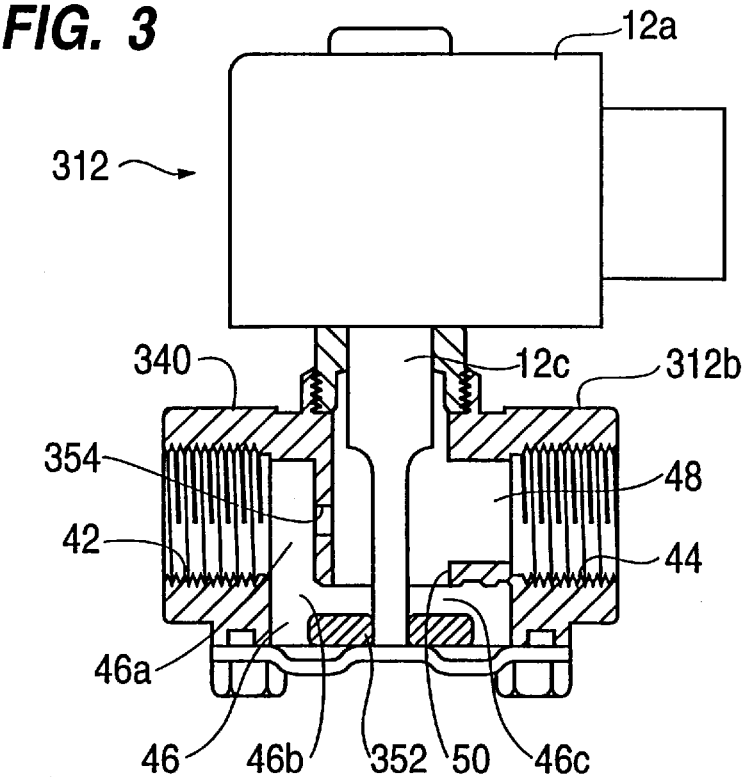
Figure 4:
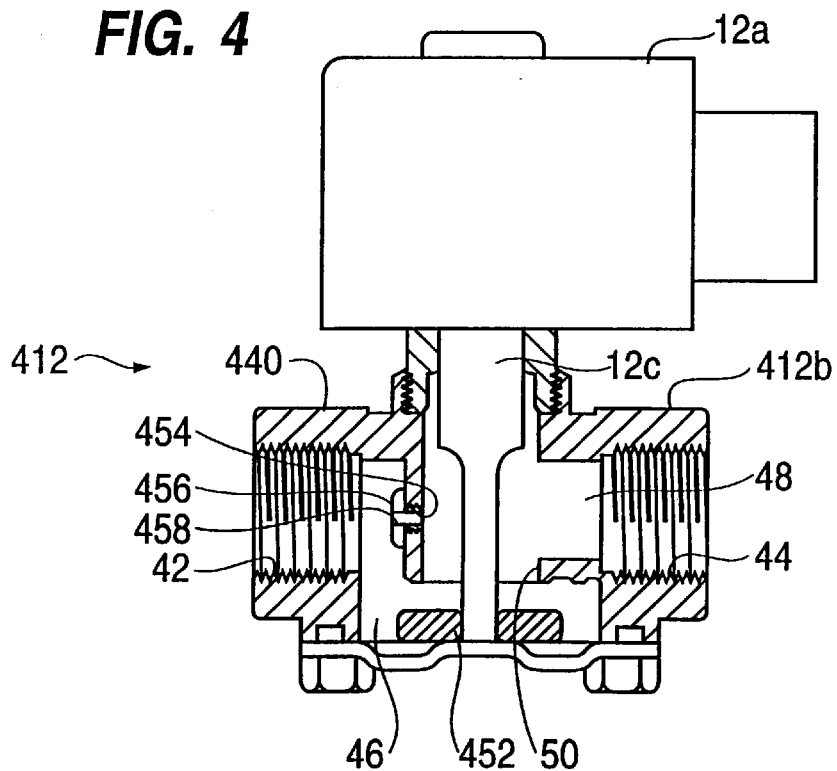
Figure 5:
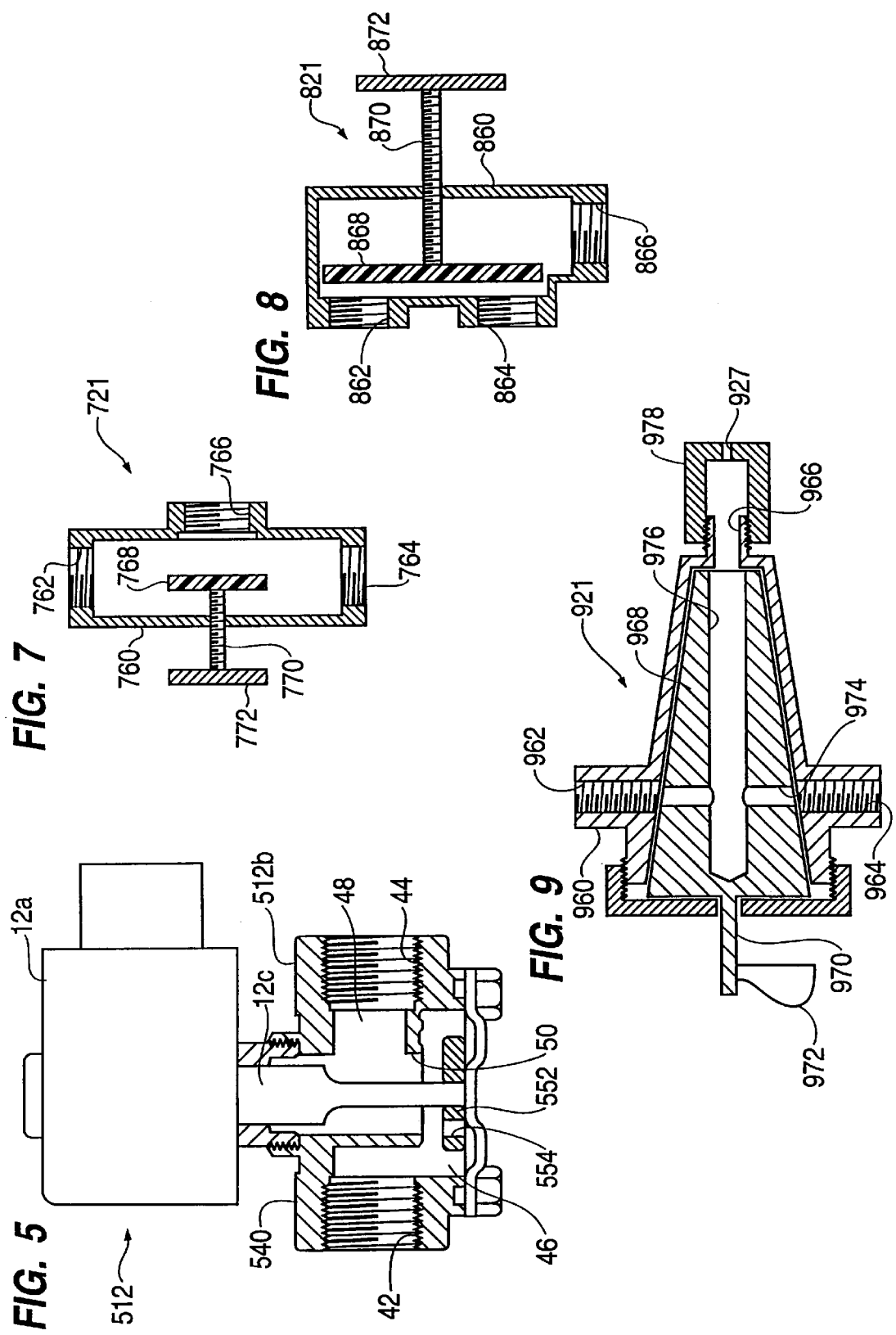
Figure 6:
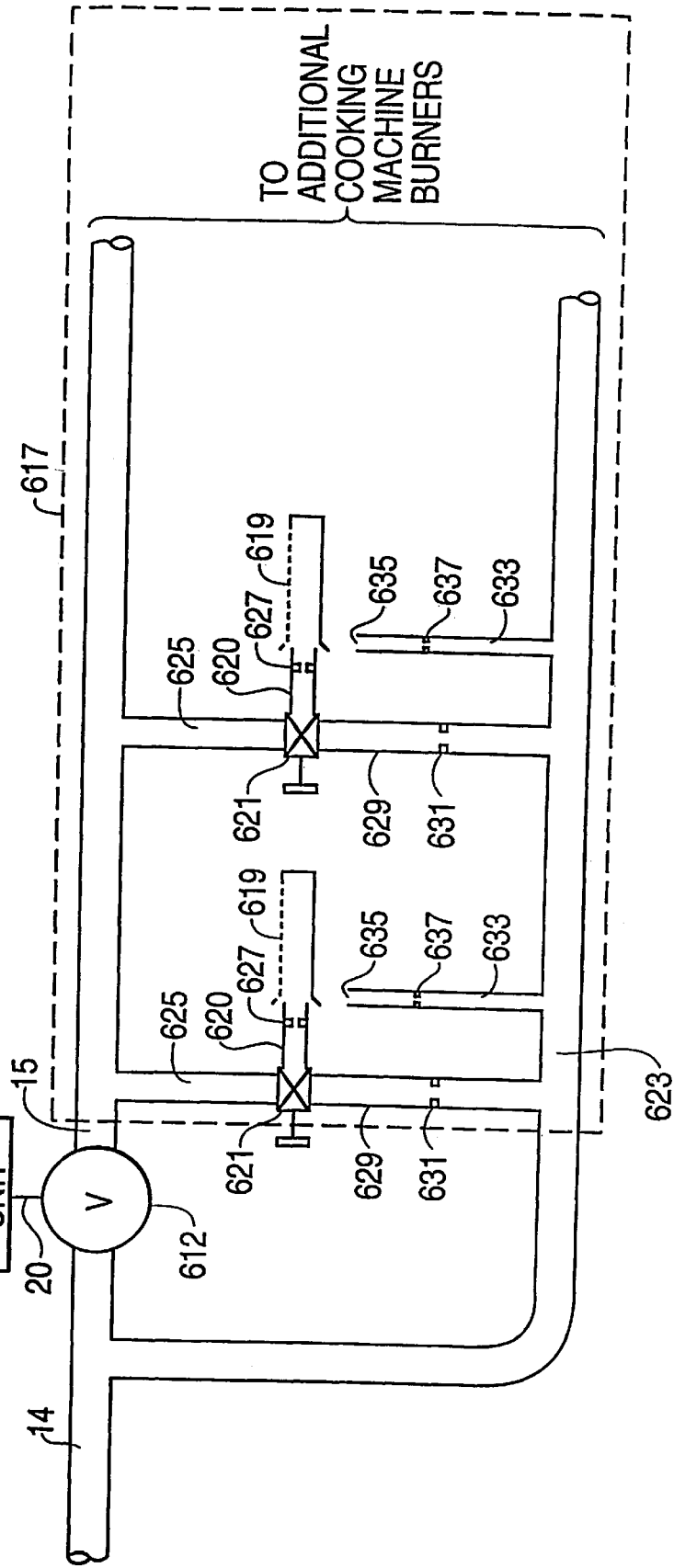
Figure 10:
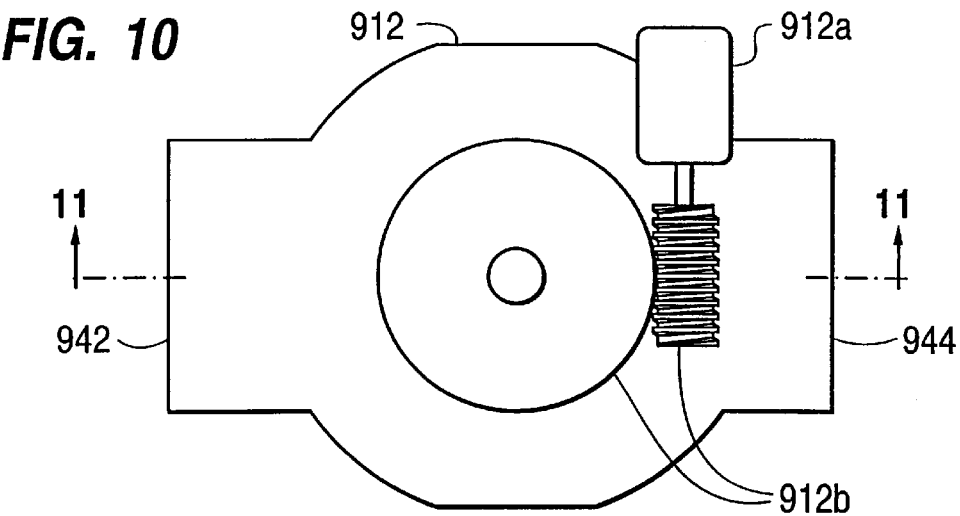
Figure 11:
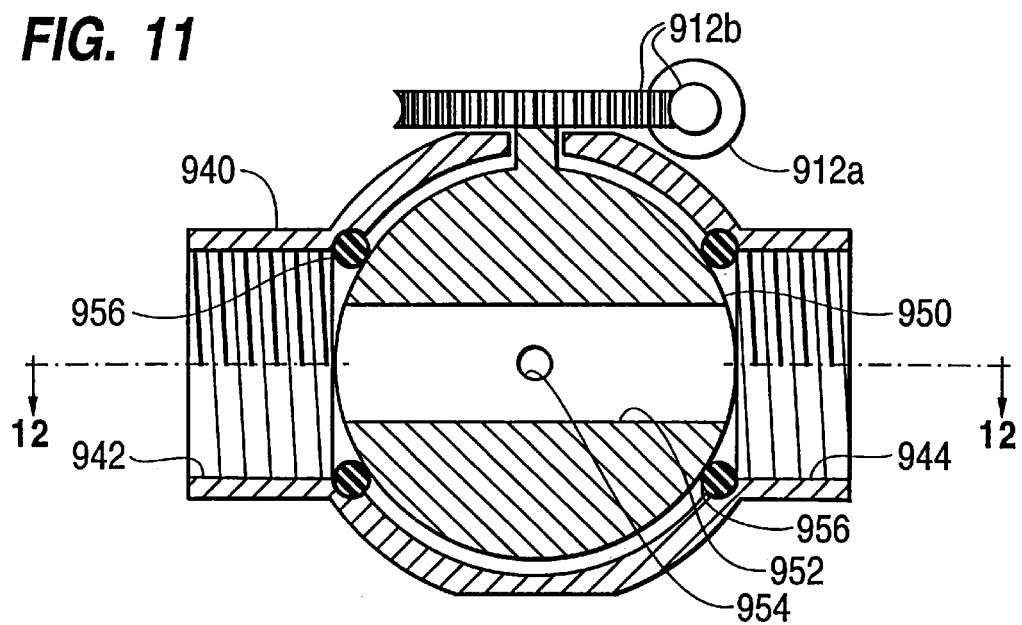
Figure 12:
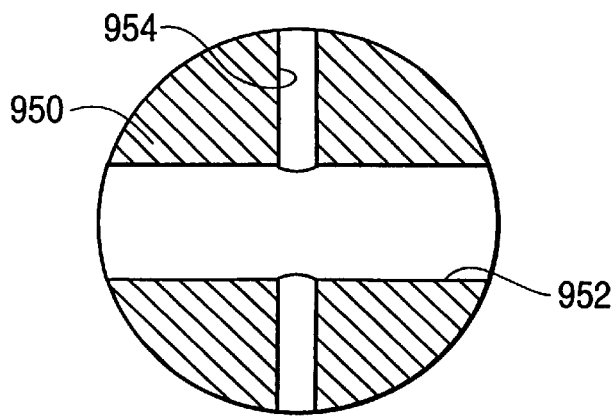

Each of FIGS. 3, 4, and 5 is a partially sectional view of a different embodiment of a fluid flow control valve in accordance with the present invention and suitable for use in the cooking machine control systems of FIGS. 1 and 13;

FIG. 6 is a schematic view of a second embodiment of a cooking machine control system and cooking machine burners in accordance with the present invention;

Each of FIGS. 7, 8 and 9 is a schematic sectional view illustrating a different embodiment of a gas shut-off valve in accordance with the present invention and suitable for use in the cooking machine control system of FIG. 6;

FIG. 10 is a top plan view of another embodiment of a fluid flow control valve in accordance with the present invention and suitable for use in the cooking machine control systems of FIGS. 1 and 13;

FIG. 11 is a sectional view taken along line 11—11 of FIG. 10;

FIG. 12 is a sectional view taken along line 12—12 of FIG. 11;

FIG. 13 is a schematic diagram of a cooking machine which might be controlled with one of the cooking machine control systems of FIGS. 1 and 6, and of a second embodiment of circuitry for such cooking machine control systems; and FIGS. 14 and 15 are schematic diagrams illustrating an alternative form of a temperature probe and its signal coupler suitable for use in the cooking machine of FIG. 13.

DETAILED DESCRIPTION OF PREFERRED EMBODIMENTS

FIG. 1 depicts a cooking machine control system in accordance with a first embodiment of the present invention, including electrical control unit 10 and solenoid valve 112. Solenoid valve 112 controls the flow of gas from a gas supply (not shown), through inlet gas pipe 14, to outlet gas pipe 15. Within a cooking machine 117, outlet gas pipe 15 connects through cut-off valves 121 to each burner 119 of the cooking machine and connects to pilot lights 123 adjacent the burners 119. Cooking machine 117 has a plurality of burners, the number of which is dependent upon the size of the cooking surface in the cooking machine, which in turn is dependent upon the amount of food that it is desired that the machine be capable of cooking at one time. FIG. 1 illustratively shows three burners 119, but any desired number might be provided. Cable 16 connects electrical plug 18 to control unit 10 to permit the control unit to be connected to a source of electrical power. Cable 20 connects control unit 10 to solenoid valve 112.

When the cooking machine 117 is shut down, for example when the restaurant or other facility is closed, each shut-off valve 121 is closed so that no gas flows to burners 119. When the cooking machine 117 is activated, the shut-off valves 121 of those burners 119 that are to be operated are opened, and those burners are ignited by their pilot lights 123. Control unit 10 then causes solenoid valve 112 to control the flow of gas from inlet pipe 14 to outlet gas pipe 15 and cooking machine 117 so as to control the cooking on the cooking machine. Solenoid valve 112 in its de-energized condition permits flow of gas at a high gas flow rate sufficient to maintain the burners 119 on the cooking machine 117 burning at a level sufficient to keep the cooking surface of the cooking machine at a desired cooking temperature. When no food is to be cooked in the cooking machine 117, control unit 10 provides power to solenoid valve 112 to activate the valve which then reduces the gas flow to a lower rate sufficient to maintain the burners 119 on the cooking machine 117 burning at a sufficient level to keeping the cooking surface at at least a predetermined standby temperature.

When food is to be cooked, start control 22 on control unit 10 is activated, causing the control unit to deactivate the solenoid valve 112, thereby opening the valve and permitting gas flow at the higher gas flow rate. After the food has been cooked, control unit 10 activates the solenoid valve 112, returning the solenoid valve to its low gas flow rate condition to maintain the cooking surface at the predetermined standby temperature. The extent to which the food is cooked can be controlled by a control 24 on control unit 10. Thus, foods having different cooking requirements can be accommodated. An indicator 26 can be provided on the control unit 10 to indicate that the system is in the standby mode, and a second indicator 28 can be provided on the control unit 10 to indicate that the cooking unit is in the cooking mode. Further, control unit 10 can be provided with a main power switch 30 and an indicator 32 to indicate that the main power switch is on.

Figure 2:
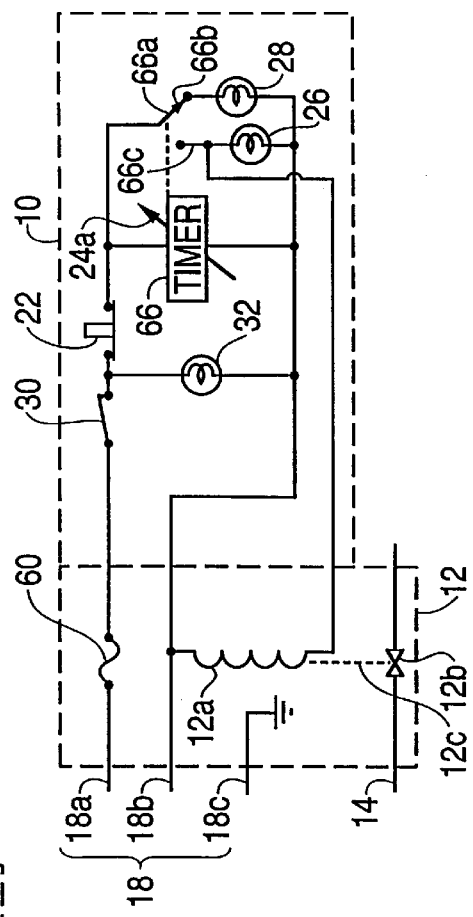
FIG. 2 is a schematic diagram of a first embodiment of circuitry for the cooking machine control systems of FIGS. 1 and 6.

FIG. 2 is a schematic diagram of a first preferred embodiment of circuitry for electrical control unit 10 in accordance with one preferred embodiment of the present invention. Power from first conductor 18a of plug 18 passes through fuse 60 to main control switch 30. When switch 30 is closed, power is applied to indicator 32 to indicate that the control unit is on. In addition, power from switch 30 passes through start control 22, which might be a normally closed pushbutton, to timer 66 which controls movable switch contact 66a. Normally closed switch contact 66b is connected to indicator 28 to indicate that gas is flowing at the high gas flow rate to permit the cooking of food in the cooking unit.

Normally open contact 66c is connected to indicator 26 which is energized when the cooking unit is in its idle or standby condition. In addition, normally open contact 66c is connected to one side of solenoid coil 12a which controls 4 solenoid valve 12b. The second side of each of timer 66, indicator 32, indicator 26, indicator 28, and solenoid coil 12a is connected to second conductor 18b of plug 18. Third conductor 18c of plug 18 provides a ground connection for solenoid valve 12.

When the cooking machine control system is operating to control cooking, main switch 30 is closed. With start pushbutton 22 closed, the timer 66 times out and causes moving contact 66a to move from normally closed contact 66b to normally open contact 66c. This provides power to solenoid coil 12a and indicator 26. Solenoid coil 12a then causes valve 12b to assume its low gas flow condition, in which gas at a flow rate sufficient to maintain the cooking unit at its standby temperature is permitted to flow, thus placing the system in its standby or idle condition. When food is to be cooked, pushbutton 22 is momentarily depressed to interrupt power to timer 66, resetting the timer and causing moving contact 66a to return to its position against normally closed contact 66b. This removes power from solenoid valve 12a and standby indicator 26, and applies power to cooking indicator 28. The de-energization of solenoid coil 12a causes valve 12b to return to its high gas flow rate condition in which gas flows at a rate sufficient to maintain the temperature of the cooking unit at the desired cooking temperature. Once timer 66 has timed the desired cooking time, it causes moving contact 66a to again move against normally open contact 66c, returning power to solenoid coil 12a and standby indicator 26 and so returning the control unit to its standby condition. If desired, this cooking time can be adjustable by means of control 24a on timer 66, as shown in FIG. 2. If a second food item is to be cooked before timer 66 has timed out, start pushbutton 22 is pushed again, resetting timer 66 to start a new cooking time interval. As is known to those skilled in the art, timer 66 and switch contacts 66a, 66b, and 66c can be a time-delay relay, either solid state or mechanical.

It is preferred that the de-energized condition of solenoid coil 12a permit the high gas flow rate so that in the event of an electrical power interruption, cooking can still be performed. However, if desired, solenoid coil 12a can be connected to normally closed contact 66b, with timer 66 immediately moving control 66a to normally open contact 66c when start pushbutton 22 is operated, and with contact 66a returning to contact 66b after a period of time determined by timer 66. The de-energized state of the solenoid coil then corresponds with the standby cooking temperature. In such event, should an electrical power failure occur, only the standby gas flow rate would be possible.

FIG. 3 depicts a first preferred embodiment of a solenoid valve 312, including solenoid coil 12a and valve 312b. Valve 312b includes a valve housing 340, having a threaded gas inlet 42 and aligned therewith a threaded gas outlet 44. Gas inlet 42 communicates with a first internal chamber 46, while gas outlet 44 communicates with a second internal chamber 48. opening 50 provides fluid communication between first internal chamber 46 and second internal chamber 48, while valve member or diaphragm 352, which is controlled by solenoid arm 12c, closes opening 50 when solenoid coil 12a is energized. With solenoid 312 in its de-energized condition as depicted in FIG. 3, a first gas flow path is defined from gas inlet 42 to gas outlet 44. This first gas flow path twists from gas inlet 42 through first internal chamber 46, opening 50, and second internal chamber 48 to gas outlet 44. Within first internal chamber 46, this twisting gas flow path includes a first turn of substantially 900 within area 46a from the direction of inlet 42 toward diaphragm 352, a second turn of substantially 900 within area 46b of first internal chamber 46 to turn toward solenoid arm 12c, and a third turn of substantially 900 within area 46c of first internal chamber 46 toward opening 50. Within second internal chamber 48, the gas flow path includes a fourth turn of substantially 90° toward outlet 44. This twisting gas flow path reduces the impact of any changes in gas pressure and so assures more uniform gas flow through solenoid valve 12.

A bypass opening 354 is formed in the wall between first internal chamber 46 and second internal chamber 48 to provide a second gas flow path from gas inlet 42 to gas outlet 44. Bypass opening 354 is preferably aligned with inlet 42 and outlet 44 so that this second gas flow path is substantially straight, going from inlet 42, through first internal chamber 46, bypass opening 354, and second internal chamber 48 to outlet 44.

When the cooking controller is to be utilized, main switch 30 is closed, energizing power on indicator 32 and making power available to normally closed pushbutton 22. In the standby mode of the cooking controller embodiment of FIG. 2, pushbutton 22 is closed and timer 66 causes moving switch contact 66a to close against normally open contact 66c. Consequently, solenoid coil 12a is energized, retracting solenoid arm 12c so that diaphragm 352 closes opening 50, and standby indicator 26 is energized, while cooking indicator 28 is de-energized. Gas flows through the second gas flow path, including bypass opening 354, to maintain the cooking unit at its standby temperature. When cooking is to occur, pushbutton 22 is depressed, momentarily opening the pushbutton and deactivating timer 66, and so causing switch contact 66a to return against normally closed contact 66b. This energizes cooking indicator 28 and de-energizes standby indicator 26 and solenoid coil 12a, extending solenoid arm 12c. Diaphragm 352 thus moves from opening 50 so that gas can flow through the first gas flow path including opening 50 to increase the gas flow rate so as to maintain the cooking unit at its cooking temperature. When pushbutton 22 closes, power is applied to timer 66 which times a preselected cooking time interval and then moves switch contact 66a from normally closed contact 66b to normally open control 66c, returning the cooking controller to its standby mode.

FIG. 4 depicts a second preferred embodiment of a solenoid valve 412, including solenoid coil 12a and valve 412b. The structure of valve 412b differs from that of valve 312b in FIG. 3 in that within valve 412b bypass opening 454, between first internal chamber 46 and second internal chamber 48, is threaded to receive an externally threaded orifice member 456. Orifice member 456 has an internal opening or orifice 458 which provides the bypass gas flow path between first internal chamber 46 and second internal chamber 48. The gas flow rate in this bypass gas flow path is determined by the size of orifice 458. Several orifice members 456 can be provided with different sizes of bypass openings 458 to permit selection of the standby gas flow rate.

In another preferred embodiment, depicted in FIG. 5, there is no bypass opening through the wall separating first internal chamber 46 and second internal chamber 48, but instead a bypass opening 554 is provided through diaphragm 552.

FIG. 6 depicts another embodiment of a cooking machine control system in accordance with the present invention, including electrical control unit 10 and solenoid valve 612 which controls the flow of gas from inlet gas pipe 14 to outlet gas pipe 15. Within cooking machine 617, outlet gas pipe 15 is connected by connecting gas pipes 625 to shut-off valves 621 which are connected by burner pipes 620 to the burners 619 of the cooking machine. Each burner pipe 620 is provided with an orifice 627 which controls the flow rate of the gas to its burner 619.

A bypass gas pipe 623 extends from inlet gas pipe 14 to connecting pipes 629 which connect to shut-off valves 621. Each connecting pipe 629 is provided with an orifice 631 to control the gas flow rate through that connecting pipe 629.

Bypass pipe 623 also is connected by connecting pipes 633 to pilot lights 635 for the burners 619. Each connecting pipe 633 is provided with an orifice 637 to control the gas flow rate through the connecting pipes 633 to the pilot lights 635.

When the cooking system is entirely shut-off, for example when the restaurant or other facility is closed, the shut-off valves 621 are closed, shutting off the flow of gas to the burners 619 from both outlet gas pipe 15 and bypass gas pipe 623. The gas continues to flow from gas inlet pipe 14 through bypass pipe 623 and connecting pipes 633 to the pilot lights 635 at flow rates determined by orifices 637. When the cooking machine is to be activated, the shut-off valves 621 are opened, and gas flows from inlet pipe 614 through bypass pipe 623 and connecting pipes 629 to the valves 621 of the burners 619. Each burner 619 is then lit by its pilot light 635. When the cooking machine is activated utilizing the control circuitry of FIG. 2, control unit 10 preferably keeps valve 612 open until timer 66 times out, so that gas also flows through outlet gas pipe 15, connecting pipes 625, and shut-off valves 621 and burners 619 to aid in lighting of the burners. Once timer 66 times out, valve 612 closes, to place the cooking machine in its standby mode in which gas flows through bypass pipe 623, connecting pipes 629, and shutoff valves 621 to the burners 619. Orifices 631 control the gas flow rates through the connecting pipes 629 to a rate that permits the burners 619 to burn at a level which maintains the cooking surface at an appropriate stand-by temperature, while orifices 637 control the gas flow rates through connecting pipes 633 to a rate appropriate for pilot lights 635. Thus, the standby mode gas flow rate can be made as low as desired by means of orifices 631 without fear of starving pilot lights 635, whose gas flow rates are separately controlled by orifices 637.

When food is to be cooked utilizing the control circuitry of FIG. 2, control unit 10 applies a signal to valve 612 to cause the valve to open. Gas then flows from inlet gas pipe 14 through valve 612 to outlet gas pipe 15 from which the gas flows through connecting gas pipes 625 and shut-off valves 621 to the burners 619. The orifices 627 maintain the gas flow rate in this condition at a rate sufficient to cause the cooking surface to be heated to an appropriate cooking temperature. After sufficient time for the food to have cooked, control unit 10 causes valve 612 to close, cutting off flow of gas in outlet gas pipe 615 and connecting gas pipes 625. This returns burners 619 to the stand-by condition in which gas flowing through bypass pipe 623 and connecting pipes 629 maintains the cooking surface at the appropriate standby temperature.

FIG. 7 illustrates a first embodiment of a shut-off valve 721 suitable for use as the shut-off valve 621 in the cooking machine control system of FIG. 6. Valve 721 has a valve body 760 with a first inlet 762, a second inlet 764 and an outlet 766. Inlets 762 and 764 are preferably threaded to mate with threads on connecting pipes 625 and 629 in FIG. 6, while outlet 766 is preferably threaded to mate with threads on burner pipe 620. Within valve body 760, valve member 768 is connected to one end of threaded stem 770 which passes through a threaded opening in valve body 760 and which has its second end connected to handle 772.

When cooking machine 617 is to be shut-off, handle 772 is rotated, causing threaded stem 770 to move valve member 768 against the interior surface of valve body 760 surrounding outlet 766. This shuts off the gas outlet, thus stopping the gas flow through outlet 766. Conversely, when the cooking machine is to be activated, handle 722 is rotated in the opposite direction, drawing valve member 768 away from opening 766 to permit gas flow through valve 721.

FIG. 8 depicts a second embodiment of a gas shut-off valve 821 including a valve body 860, a first inlet 862, a second inlet 864, and an outlet 866. Again, inlets 862 and 864 and outlet 866 are preferably threaded for mating with connecting pipes 625 and 629 and burner pipe 620. Within valve body 860, valve member 868 is connected to one end of threaded stem 870 which passes through a threaded opening in the valve body. The second end of stem 870 is connected to handle 872.

When the cooking machine 617 is to be in its deactivated condition, handle 872 is rotated, causing threaded stem 870 to bring valve member 868 into contact with the interior surface of valve body 860 surrounding inlets 862 and 864. This shuts off the gas inlets, thus stopping the flow of gas through the valve 821. When the cooking machine is to be activated, handle 872 is rotated in the opposite direction, withdrawing valve member away from inlets 862 and 864 to permit the gas to flow through the valve body to the burner pipe 620.

FIG. 9 depicts a third embodiment of a gas shutoff valve 921 including a valve body 960, a first inlet 962, a second inlet 964, and an outlet 966. Inlets 962 and 964 and outlet 966 are again preferably threaded for mating connecting pipes 625 and 629 and burner pipe 620. Such threading might be either internal or external, as is also the case with valves 721 and 821. Within valve body 960, valve member 968 is connected to one end of threaded stem 970 which passes through a threaded opening in the valve body. The second end of stem 970 is connected to handle 972. A bore 974 passes diametrically through valve member 968, while an axial bore 976 extends into valve member 968 from the end opposite stem 970 and intersects diametrical bore 974.

When the cooking machine 617 is to be in its deactivated condition, handle 972 is rotated to rotate valve member 968 so that bore 974 is not aligned with inlets 962 and 964. This shuts off the gas inlets, thus stopping gas flow through gas shutoff valve 921. When the cooking machine is to be activated, handle 972 is rotated to align diametrical bore 974 with inlets 962 and 964 so that gas from these inlets can flow to axial bore 976 and outlet 966 of valve 921.

Preferably, as depicted in FIG. 9, valve 921 includes an orifice member 978 having an outlet orifice 927 sized to provide gas flow at the desired rate for the burners. If desired, orifice member 978 can also be externally threaded to couple outlet 966 to the burners. Similarly, inlets 962 and 964 can restrict the gas flow to the desired rate, thereby incorporating orifice 631 into valve 921, if desired.

Valve 721 of FIG. 7 is exemplary of valves shutting off the valve outlet, while valves 821 and 921 of FIGS. 8 and 9 are exemplary of valves shutting off the valve inlets. In the cooking machine depicted in FIG. 6, any of the shut-off valves 721, 821, and 921 could be utilized. With shut-off valve 721 closed, a path exists between inlet 762 and 764. However, in cooking machine 617 this is acceptable because when the cooking machine is shut-off, either completely or partially, the outlets of those valves 721 whose burners are not to be lit are closed.

FIGS. 10, 11, and 12 depict another embodiment of a fluid flow control valve in accordance with the present invention which is suitable for use in the cooking machine control system of FIG. 1 and which is particularly suitable for incorporation into a system to be used with a gas/barbecue grill. Valve 912 includes a solenoid 912a which actuates a worm gear 912b to rotate ball 950 within valve housing 940. 0-rings 956 provide seals around ball 950. A similar seal can be provided in shutoff valve 921 of FIG. 9. Ball 950 has a first bore 952 and a second bore 954 passing through it at right angles to each other. When solenoid 912a is de-energized, ball 950 is positioned within valve housing 940 as depicted in FIG. 11 so that a first fluid flow path exists from valve inlet 942 through bore 952 to valve outlet 944. When solenoid 912a is energized, worm gear 912b rotates ball 950 to align bore 954 with inlet 942 and outlet 944, thereby providing a second fluid flow path from inlet 942 through bore 952 to outlet 944. As can be seen from FIGS. 11 and 12, bore 952 is of a larger size than bore 954. Bore 952 is sized to permit gas flow at a rate sufficient to bring the cooking surface to an appropriate cooking temperature, while bore 954 is sized to permit gas flow at a rate to maintain cooked food warm, without over-cooking, and likewise to maintain the cooking surface at an appropriate standby temperature.

FIG. 13 depicts a second embodiment of circuitry for controlling a cooking machine in accordance with the present invention which returns the gas to its standby flow rate when the food item being cooked has reached a preselected temperature, rather than after a predetermined time as in the embodiment of FIG. 2. A gas grill 70 is equipped with a rotisserie 72 on which a food item 74 is to be cooked. Rotisserie 72 includes supports 76, extending up from the bed of grill 70, and two-part shaft 78 on which food item 74 is supported. A motor (not shown) rotates shaft 78 at a speed appropriate for cooking the food item over gas grill 70. A temperature sensing probe 80 is inserted into food item 74 and is connected by leads 82 to brushes 84 that contact slip rings 86 on one portion of shaft 78. Leads 82 and brushes 84 rotate with shaft 78 and food item 74. Within shaft 78, slip rings 86 are connected to leads 88 that pass through the adjacent support 76 to temperature sensing circuit 90. A temperature setting control 24b permits setting of a desired temperature to which the food item 74 is to be cooked.

Control 24b and temperature sensing circuit 90 provide their outputs to temperature comparison circuit 92 which has its output connected to one side of relay coil 94 within control unit 10a. The second side of relay coil 94 is connected to the second conductor 18b of plug 18. Relay coil 94 controls normally open contact 94a. The junction of power switch 30 and start pushbutton 22 is connected to the input of monostable multivibrator or one-shot 96. Relay coil 66' has its first side connected to its own normally-open contact 66c, to the fixed contact 94b of relay 94, and to the output of one-shot 96.

When control unit 10a is turned on by closing power switch 30, one-shot 96 applies a pulse to relay coil 66', closing moving contact 66a against normally open contact 66c. As a result, power passes through contacts 66a and 66c to coil 66', maintaining the relay energized. Power from contact 66c also goes to solenoid coil 12a and indicator 26. Solenoid valve 12b closes the cooking flow rate gas path, and so the system is in its standby condition.

When a food item such as food item 74 is to be cooked, start pushbutton 22 is momentarily depressed, interrupting power to relay coil 66'. As a result, moving contact 66a closes against normally closed contact 66b, interrupting power to solenoid coil 12a, and so opening solenoid valve 12b to permit gas to flow at the cooking flow rate. Indicator 28 is energized at this time. The temperature to which it is desired that food item 74 be cooked is set at control 24b, and when the output from temperature sensing probe 80, by way of temperature sensing circuit 90, indicates that the set temperature has been reached, temperature comparison circuit 92 applies an output to relay coil 94, closing moving contact 94a against fixed contact 94b. Power then flows through contacts 94a and 94b to relay coil 66', returning the system to the standby condition. When the output from temperature sensing circuit 90 stops, whether due to removal of temperature sensing probe 80 from food item 74 or otherwise, relay coil 94 is no longer energized, and so contact 94a opens from fixed contact 94b. However, relay coil 66' remains energized through contacts 66a and 66b. The temperature sensing circuitry and associated components thus replace timer 66 and associated components of the embodiment of FIG. 2. As in the embodiment of FIG. 2, relays 66' and 94 and their contacts might be solid state or mechanical.

FIGS. 14 and 15 illustrate an alternative embodiment of a temperature sensing probe and a temperature signal coupler suitable for use with the system of FIG. 13. Temperature sensing probe 80a extends from the end of one section of shaft 78 so that probe 80a is inserted into the food item 74 when food item 74 is mounted on the two sections of shaft 78 for cooking. The two temperature sensing leads 88 within shaft 78 connect to annular contacts 88a and 88b on signal coupler 98 which is mounted in the adjacent support 76.

Temperature sensing probe 80a, leads 88, signal coupler 98, and annular contacts 88a and 88b rotate with shaft 78. On the opposite side of support 76 two stationary leads 88' couple the annular contacts 88a and 88b to temperature sensing circuit 90.

The cooking machine control system of the present invention are also suited for control of home cooking machines, such as gas/barbecue grills of the type often utilized for outdoor cooking by families and other small groups. The embodiments of FIG. 1 and FIG. 6 are likewise usable by such gas/barbecue grills although such grills may have fewer burners than depicted in those figures. In cooking on such a gas/barbecue grill, the low gas flow rate can be set to keep food that has been cooked warm following cooking. Thus, if the person doing the cooking becomes distracted and does not remove the food from the grill or manually lower the gas flow rate so as to reduce the temperature of the cooking surface, the control system permits the gas to flow at the rate appropriate for cooking for until the food is cooked and then automatically reduces the gas flow rate so as to avoid over-cooking of the food.

It is thus seen that the present invention provides a cooking machine control system in which the gas flow to the cooking machine burners is controlled so as to maintain the cooking surface at an appropriate standby temperature when no food is being cooked, to rapidly bring the cooking surface to the appropriate temperature to cook the food, and to return the cooking surface to the standby temperature after the food is cooked. It is further seen that the present invention provides alternative forms of valve apparatus permitting such control and also provides a gas shut-off valve which can shutoff the flow of gas, or other fluid, from each of two input pipes to a common output pipe.

Although the present invention has been described with reference to preferred embodiments, various alterations, rearrangements, and substitutions can be made, and still the result is within the scope of the invention.

What is claimed is:

1. A cooking machine control system for controlling flow of gas to a burner of a gas cooking machine so as to maintain a cooking surface of the cooking machine at an appropriate standby temperature when no food is being cooked, to bring the cooking surface to an appropriate cooking temperature when food is being cooked, and to return the cooking surface to the standby temperature once the food has been cooked, said control system comprising an inlet gas pipe for receiving gas from a gas source; an outlet gas pipe for providing gas to the burner of the cooking machine; and a valve apparatus coupling said inlet gas pipe to said outlet gas pipe to control flow of gas through said outlet gas pipe to the burner, wherein said valve apparatus comprises:

a valve body member having a gas inlet coupled to said inlet gas pipe; a gas outlet coupled to said outlet gas pipe; means within said valve body member defining a first gas flow path from said gas inlet to said gas outlet to permit gas flow from said inlet gas pipe, along said first gas flow path, to said outlet gas pipe at a first gas flow rate sufficient to maintain the cooking surface at the cooking temperature; and means within said valve body member defining a second gas flow path from said gas inlet to said gas outlet to permit gas flow from said inlet gas pipe, along said second gas flow path, to said outlet gas pipe at a second gas flow rate sufficient to maintain the cooking surface at the standby temperature;

a valve member within said valve body member;

actuating means for moving said valve member between a first valve position, in which said valve member allows gas flow along said first gas flow paths and a second valve position, in which said valve member blocks gas flow along said first gas flow path while allowing gas flow along said second gas flow path;

control means normally causing said actuating means to move said valve member to the second valve position and responsive to a start signal to cause said actuating means to move said valve member to the first valve position to cook the food and then to move said valve member back to the second valve position; and input means for applying the start signal to said control means.

2. A cooking machine control system as claimed in claim 1, wherein said bypass opening extends through said valve member.

3. A cooking machine control system as claimed in claim 1, further comprising an orifice member engaged in said bypass opening and having a gas flow orifice therethrough, for controlling the rate of gas flow in said second gas flow path.

4. A cooking machine control system as claimed in claim 3, wherein said bypass opening is internally threaded and said orifice member is externally threaded to permit changing of the orifice member in said bypass opening to control the gas flow rate through said orifice member.

5. A cooking machine control system as claimed in claim 1, wherein said control means comprises a temperature sensor for sensing the temperature of the food being cooked, a temperature control for setting a preselected temperature, a comparison circuit for providing an output when the sensed temperature is substantially equal to the preselected temperature, and a control circuit responsive to the comparison circuit output for causing said actuator means to move said valve member back to the second valve position.

6. A cooking machine control system as claimed in claim 5, further comprising a rotatable shaft for holding the food over the burner of the cooking machine; and wherein said temperature sensor comprises a temperature probe extending from a section of said rotatable shaft for insertion into the food to support the food on said shaft section.

7. A cooking machine control system as claimed in claim 6, wherein said temperature sensor further comprises an annular signal coupler for coupling temperature signals from said temperature probe to said comparison circuit.

8. A cooking machine control system for controlling flow of gas to a burner of a gas cooking machine so as to maintain a cooking surface of the cooking machine at an appropriate standby temperature when no food is being cooked to bring the cooking surface to an appropriate cooking temperature for a predetermined period of time when food is being cooked, and then to return the cooking surface to the standby temperature, said control system comprising an inlet gas pipe for receiving gas from a gas source; an outlet gas pipe for providing gas to the burner of the cooking machine; and a valve apparatus coupling said inlet gas pipe to said outlet gas pipe to control flow of gas through said outlet gas pipe to the burner, wherein said valve apparatus comprises:

a valve body member having an internal valve chamber, a valve inlet coupled to said inlet gas pipe and communicating with the internal valve chamber, and a valve outlet coupled to said outlet gas pipe and communicating with the internal valve chamber;

a valve member within said internal valve chamber and having first and second bores therethrough, with said first bore having a greater diameter than said second bore;

actuating means for rotating said valve member between a first valve position in which said first bore is aligned with said valve inlet and said valve outlet to provide a first gas flow path, permitting gas to flow from said inlet gas pipe, through said valve body member, to said gas outlet at a first gas flow rate sufficient to maintain the cooking surface at the cooking temperature, and a second valve position in which said second bore is aligned with said valve inlet and said valve outlet to provide a second gas flow path, permitting gas to flow from said inlet gas pipe, through said valve body member, to said outlet gas pipe at a second gas flow rate sufficient to maintain the cooking surface at the standby temperature;

control means normally causing said actuating means to rotate said valve member to the second valve position and responsive to a start signal to cause said actuating means to rotate said valve member to the first valve position to cook the food and then to rotate said valve member back to the second valve position; and input means for applying the start signal to said control means.

9. A cooking machine control system as claimed in claim 8, wherein said actuating means comprises a worm gear connected to said valve member, and a solenoid operable to turn said worm gear to rotate said valve member.

10. A cooking machine control system as claimed in claim 8, wherein said actuating means comprises a solenoid and said control means comprises a temperature sensor for sensing the temperature of the food being cooked, a temperature control for setting a preselected temperature, a comparison circuit for providing an output when the sensed temperature is substantially equal to the preselected temperature, and a control circuit responsive to the comparison circuit output for moving said valve member back to the first valve position.

11. A cooking machine control system as claimed in claim 10, further comprising a rotatable shaft for holding the food over the burners of the cooking machine; and wherein said temperature sensor comprises a temperature probe extending from a section of said rotatable shaft for insertion into the food to support the food on said shaft section.

12. A cooking machine control system as claimed in claim 11, wherein said temperature sensor further comprises an annular signal coupler for coupling temperature signals from said temperature probe to said comparison circuit.

13. A cooking machine control system as claimed in claim 1, wherein said control means comprises a timing circuit for causing said actuating means to move said valve member back to the second valve position a pre-selected time after the start signal.

14. A cooking machine control system as claimed in claim 13, wherein said timing circuit includes adjustment means permitting selection of the pre-selected time.

15. A cooking machine control system as claimed in claim 1, wherein said actuating means comprises a solenoid.

16. A cooking machine control system as claimed in claim 1, wherein:

said valve body member further has means within said valve body member defining a first internal chamber communicating with said gas inlet, and a second internal chamber communicating with said gas outlet;

said means defining the first gas flow path comprises means within said valve body member defining a communication opening between said first internal chamber and said second internal chamber to provide the first gas flow path from said inlet gas pipe, through said valve body member gas inlet, said first internal chamber, said communication opening, said second internal chamber, and said valve body member gas outlet to said outlet gas pipe;

said means defining the second gas flow path comprises means within said valve body member defining a bypass opening between said first internal chamber and said second internal chamber to provide the second gas flow path from said inlet gas pipe, through said valve body member gas inlet, said first internal chamber, said bypass opening, said second internal chamber, and said valve body member gas outlet, to said outlet gas pipe; and said valve member in the second valve position blocks the communication opening to block gas flow along the first gas flow path while allowing gas flow along the second gas flow path, and in the first valve position opens the communication opening to allow gas flow along the first gas flow path.

17. A cooking machine control system as claimed in claim 16, wherein said bypass opening extends through said valve member.

18. A cooking machine control system as claimed in claim 16, further comprising an orifice member engaged in said bypass opening and having a gas flow orifice therethrough, for controlling the rate of gas flow in said second gas flow path.

19. A cooking machine control system as claimed in claim 18, wherein said bypass opening is internally threaded and said orifice member is externally threaded to permit changing of the orifice member in said bypass opening to select the gas flow rate in the second gas flow path.

20. A cooking machine control system for controlling flow of gas to a burner of a gas cooking machine so as to maintain a cooking surface of the cooking machine at an appropriate standby temperature when no food is being cooked, to bring the cooking surface to an appropriate cooking temperature when food is being cooked, and to return the cooking surface to the standby temperature once the food has been cooked, said control system comprising:

an inlet gas pipe for receiving gas from a gas source;

a burner pipe for providing gas to the burner of the cooking machine;

a control valve coupling said inlet gas pipe to said burner pipe for controllably providing gas to the burner pipe at a first gas flow rate sufficient to maintain the cooking surface of the cooking machine at the cooking temperature;

a bypass gas pipe connecting said inlet gas pipe to said burner pipe for supplying gas to said burner pipe at a second gas flow rate sufficient to maintain the cooking surface of the cooking machine at the standby temperature;

control means normally causing said control valve to assume a first condition in which gas is prevented from flowing through said control valve, and including means responsive to a start signal for causing said control valve to assume a second condition in which gas is permitted to flow through said control valve to said burner pipe at the first gas flow rate to cook the food, and a temperature sensor for sensing the temperature of the food being cooked, a temperature control for setting a preselected temperature, a comparison circuit for providing an output when the sensed temperature is substantially equal to the preselected temperature, and a control circuit responsive to the comparison circuit output for causing said control valve to return to the first condition; and input means for applying the start signal to said control means, whereby with said cooking machine control system in a standby mode, gas flows to said burner pipe at the second gas flow rate, and in response to the start signal said cooking machine control system switches to a cooking mode and gas flows through said control valve to said burner pipe at the first gas flow rate to cook the food, and after the food is cooked said cooking machine control system returns to the standby mode and gas flows to said burner pipe at the second gas flow rate.

21. A cooking machine control system as claimed in claim 20, further comprising a rotatable shaft for holding the food over the burner of the cooking machine; and wherein said temperature sensor comprises a temperature probe extending from a section of said rotatable shaft for insertion into the food to support the food on said shaft section.

22. A cooking machine control system as claimed in claim 21, wherein said temperature sensor further comprises an annular signal coupler for coupling a temperature signal from said temperature probe to said comparison circuit.

23. A cooking machine control system as claimed in claim 20, wherein said control means comprises a timing circuit for causing said actuating means to move said valve member back to the first valve position a preselected time after the start signal.

24. A cooking machine control system as claimed in claim 23, wherein said timing circuit includes adjustment means permitting selection of the pre-selected time.

25. A cooking machine control system as claimed in claim 20, wherein said actuating means comprises a solenoid.

26. A cooking machine control system as claimed in claim 20, wherein said burner pipe includes a shut-off valve capable of assuming alternatively an open valve condition, in which gas from said control valve and from said bypass pipe is permitted to flow through said burner pipe, and a closed valve condition, in which gas from said control valve and from said bypass pipe is prevented from flowing though said burner pipe.

27. A cooking machine control system as claimed in claim 26, wherein said shut-off valve includes a valve member for preventing gas from said control valve and from said bypass pipe from flowing into said shut-off valve in the closed valve condition.

28. A cooking machine control system as claimed in claim 26, wherein said shut-off valve includes a valve member for preventing gas from flowing out of said shut-off valve to said burner pipe in the closed valve condition.

29. A cooking machine control system as claimed in claim 20, wherein said bypass gas pipe includes flow limiting means for limiting the second gas flow rate to a pre-selected rate.

30. A cooking machine control system as claimed in claim 20, wherein said bypass gas pipe includes means for providing gas flow at a third gas flow rate for a pilot light for the burner.

31. A cooking machine control system as claimed in claim 20, wherein said bypass gas pipe includes flow limiting means for limiting the third gas flow rate to a pre-selected value.

* * * * *